US010673982B2

(12) United States Patent
Acosta et al.

(10) Patent No.: US 10,673,982 B2
(45) Date of Patent: Jun. 2, 2020

(54) CLOUD-BASED APPLICATION COMMUNICATION WITH HIERARCHICAL DATABASES

(71) Applicant: American Express Travel Related Services Company, Inc., New York, NY (US)

(72) Inventors: Juan Acosta, Pembroke Pines, FL (US); Horacio Alejandro Delgado, Miami, FL (US); Tapan K. Ganguly, Phoenix, AZ (US); Vishal Jha, Sunrise, FL (US); Alan Daniel Schwartz, Aventura, FL (US); Zelisha Siclait, Plantation, FL (US); Mathew Varghese, Weston, FL (US); Aditya Yallaturu, Coral Springs, FL (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 17 days.

(21) Appl. No.: 16/001,139

(22) Filed: Jun. 6, 2018

(65) Prior Publication Data

US 2019/0379761 A1     Dec. 12, 2019

(51) Int. Cl.
| *G06F 13/00* | (2006.01) |
| *H04L 29/08* | (2006.01) |
| *H04L 29/06* | (2006.01) |
| *G06F 16/23* | (2019.01) |

(52) U.S. Cl.
CPC .............. *H04L 67/32* (2013.01); *G06F 16/23* (2019.01); *H04L 63/10* (2013.01); *H04L 65/102* (2013.01); *H04L 65/1016* (2013.01); *H04L 67/10* (2013.01)

(58) Field of Classification Search
CPC ....... H04L 41/024; H04L 63/08; H04L 67/28; H04L 67/02; H04L 67/32; H04L 63/10; H04L 65/102; H04L 67/10; H04L 65/1016; G06F 16/2452; G06F 16/24522; G06F 21/6218; G06F 16/23
USPC ................ 709/203, 217–219, 238, 227–229; 719/330, 328, 311
See application file for complete search history.

(56) References Cited

U.S. PATENT DOCUMENTS

| 6,964,053 | B2 * | 11/2005 | Ho .......................... H04L 29/06 719/313 |
| 7,559,066 | B2 * | 7/2009 | Ho ......................... G06F 9/5027 709/246 |
| 8,201,193 | B2 * | 6/2012 | Ho ......................... G06F 9/5027 709/246 |
| 10,038,682 | B2 * | 7/2018 | Chan ....................... H04L 63/08 |
| 2002/0042849 | A1 * | 4/2002 | Ho ......................... G06F 9/5027 719/329 |
| 2004/0111464 | A1 * | 6/2004 | Ho .......................... H04L 29/06 709/203 |
| 2008/0250434 | A1 * | 10/2008 | Ho ......................... G06F 9/5027 719/329 |
| 2017/0104742 | A1 * | 4/2017 | Chan ....................... H04L 63/08 |

* cited by examiner

*Primary Examiner* — Kenneth R Coulter
(74) *Attorney, Agent, or Firm* — Thomas | Horstemeyer, LLP (57) ABSTRACT

A gateway may allow for a cloud-based application to connect to a hierarchical type database. The gateway may identify a connection route between a cloud instance and the hierarchical type database. The gateway may translate a SQL call from the cloud-based application to a DL/I call to access data on the hierarchical type database.

20 Claims, 3 Drawing Sheets

CLOUD-BASED APPLICATION COMMUNICATION WITH HIERARCHICAL DATABASES

FIELD

The present disclosure relates to communications between cloud-based applications and databases.

BACKGROUND

A large amount of legacy data is stored on Information Management System ("IMS") databases. IMS is a hierarchical database management system that controls data for databases in IBM mainframes. Information Management System/Database ("IMS/DB") is the back end database part of IMS, and either Information Management System/Transaction Manager ("IMS/TM") or Customer Information Control System ("CICS") provides the front end online interaction.

Many applications are being developed in cloud-based systems which would benefit from access to the data stored in the IMS databases. Typically, cloud-based applications access IMS databases using middleware such as IBM Websphere®, or DataPower and IMS OTMA. However, using such processes creates processing delays and increases costs associated with accessing data stored in IMS databases. Additionally, cloud based applications do not have dedicated hardware assigned to the applications. As such, cloud-based systems may lack the predefined environments to facilitate API calls to IMS databases.

SUMMARY

A system, method, and/or computer readable medium (collectively, the "system") is disclosed for communicating between a cloud-based application and an IMS database. The system may perform operations including receiving a structured query langage (SQL) call from a cloud-based application; identifying, based on the SQL call, a cloud instance and an information management system (IMS) database; translating the SQL call to a (DL/I) call; transmitting the DL/I call to the IMS database; receiving a response from the IMS database; and transmitting the response to the cloud instance.

In various embodiments, the cloud instance transmits the response to the cloud-based application. The system may transmit the DL/I call to the IMS database via IMS Connect. The IMS Connect may be exposed to the cloud-based application as an API as a service. The system may refer to a mapping table to identify the IMS database. The SQL call may comprise at least one of get, put, post, or delete. The cloud instance may comprise a virtual server instance running on a cloud network.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

A gateway may allow for a cloud-based application to connect to a hierarchical type database. The gateway may identify a connection route between a cloud instance and the hierarchical type database. The gateway may also translate a SQL call from the cloud-based application to a DL/I call to access data on the hierarchical type database.

Figure 1:
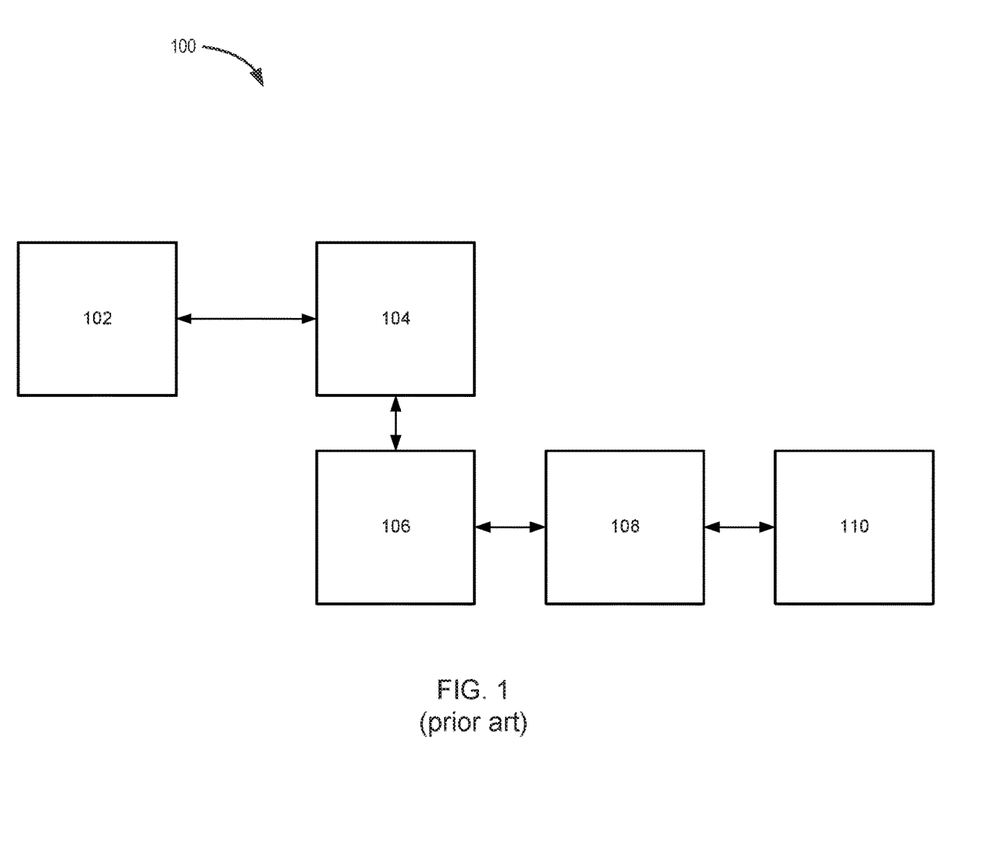
FIG. 1 illustrates a prior art system for communicating between a cloud-based application and an IMS database.

Referring to FIG. 1, a prior art system 100 for communicating between cloud-based applications and IMS databases is illustrated, according to various embodiments. The system may comprise one or more consumers 102. The consumers 102 may use a web client to interact with the system 100. In various embodiments, the consumers 102 may comprise customer service representatives. For example, a customer service representative may be on the phone with a consumer, and the customer service representative may utilize a web client to retrieve or modify data regarding the consumer, such as the balance of a transaction account or the date of a payment. However, the consumers 102 may comprise any entity which desires to interact with an IMS database.

A cloud-based application 104 may transmit requests through a middleware broker 106, such as IBM DataPower. In various embodiments, the cloud-based application 104 may transmit requests using MQ messages.

The system 100 may further comprise an IMS OTMA facility 106. The IMS OTMA facility 106 may be a transaction-based connectionless client/server protocol that runs on IMS Version 5.1 or later. The IMS OTMA facility 106 may function as an interface for host-based communications servers accessing IMS TM applications through the z/OS® Cross Systems Coupling Facility ("XCF").

The system 100 may comprise an integrated TCP/IP gateway for IMS, such as IMS Connect 108. IMS Connect 108 allows user-written applications to access IMS data and transaction services from a TCP/IP client.

The middleware broker 106 may put the request to the IMS OTMA facility 106 or the IMS Connect, which may in turn transmit the request to an Information Management System ("IMS") database 110. IMS is an IBM hierarchical database management system ("DBMS") for IBM mainframes. The IMS database 110 may process the request and respond with the requested data. Each step in the process may add processing time, and it may be necessary for application developers to have knowledge of the IMS database 110 system in order to program applications to interface with the IMS database 110.

Figure 2:
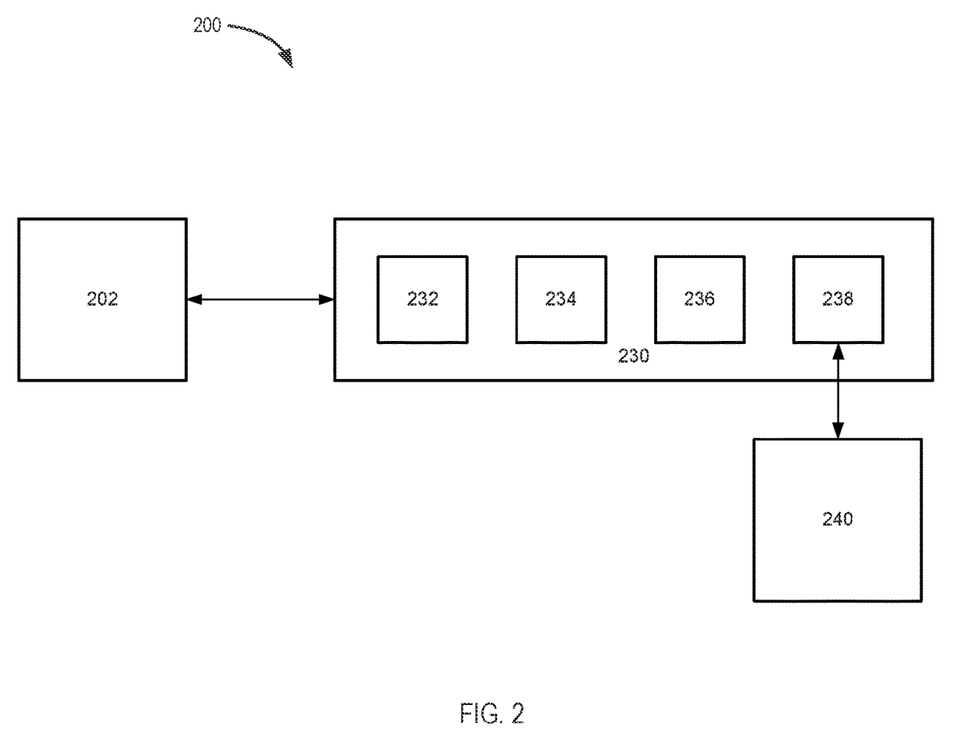
FIG. 2 illustrates a system for communication between a cloud-based application and an IMS database, in accordance with various embodiments.

Referring to FIG. 2, a system 200 for connecting to a hierarchical type database by making simple SQL calls from Java is illustrated, according to various embodiments. A consumer 202 may wish to access data stored in a hierarchical type database 240. In various embodiments, the database 240 may be an IMS database. The consumer 202 may be utilizing an application operating in a cloud environment 230.

The cloud environment may comprise infrastructure services 232. The infrastructure services 232 may provide common services (e.g., caching, logging, monitoring, messaging, BigData services, file sharing, etc). The cloud environment 230 may comprise a Platform as a Service (PaaS) environment 234, which may comprise software for container-based software deployment and management (e.g., OpenShift, provided by Red Hat, Inc. of Raleigh, N.C.). The cloud environment 230 may comprise an Infrastructure as a Service (IaaS) environment 236 (e.g., OpenStack, provided by the OpenStack Foundation, which is a free and open-source software platform for cloud computing) which provides virtual servers and other resources. The IaaS environment 236 may control large pools of compute, storage, and networking resources throughout a datacenter, managed through a dashboard or via the OpenStack API. The cloud environment 230 may also comprise one or more Java Database Connectivity ("JDBC") drivers. The JDBC driver may be a programming interface that lets Java applications access a database via the SQL language.

The system 200 may comprise an integrated gateway 238, such as IMS connect. In various embodiments, the gateway 238 may operate as an API as a service, which is a Software as a Service (SaaS) primarily exposed as an API. The gateway 238 may be configured to identify routing paths for SQL calls originating from the cloud environment 230, and translate the SQL calls to Data Language Interface (DL/I) calls in order to query an IMS database 240. DL/I calls are structured in a syntax which is compatible with the IMS database 240.

Figure 3:
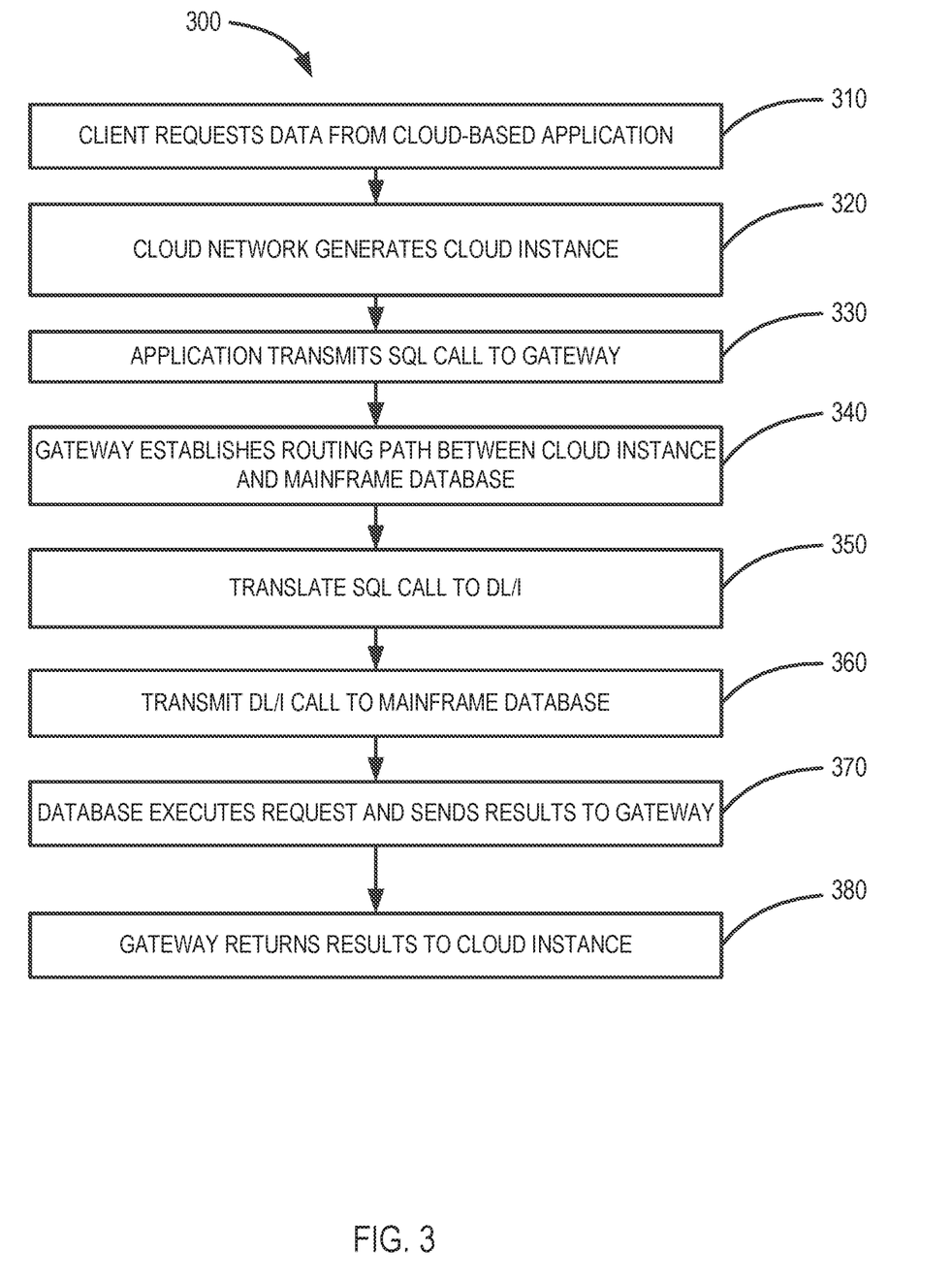
FIG. 3 illustrates flowchart of a process for communicating between a cloud-based application and an IMS database, in accordance with various embodiments.

Referring to FIG. 3, a process 300 for retrieving data is illustrated, according to various embodiments. A client may transmit a request for data to a cloud-based application (step 310). In various embodiments, the request may be a get, pull, post, or delete request. For example, the request may be a request to view data for purchases completed at a merchant in 1974. The cloud network may locate a resource for the request. The cloud network may generate a cloud instance to handle the request (step 320). The cloud instance may be a virtual server instance running on the cloud.

The application may generate a SQL call with a particular data request and transmit the SQL call to an integrated gateway, such as IMS Connect (step 330). The gateway may refer to a mapping table to identify a mainframe database which contains the data requested in the SQL call. The gateway may establish a routing path between the cloud instance and the mainframe database identified in the SQL call (step 340).

The gateway may translate the SQL call from SQL to DL/I (step 350). The gateway may transmit the DL/I call to the identified mainframe database (step 360). The database may execute the request and return the results to the gateway (step 370). The gateway may return the results to the cloud instance, which may in turn return the results to the client (step 380).

By utilizing the systems and methods described herein, cloud-based applications are able to access legacy IMS data from modern cloud environments. The data is accessible using standard SQL calls, without requiring application developers to have knowledge of mainframe hierarchical databases. The direct connection to the IMS databases reduces response time to 10 ms or less, as opposed to existing processes using WebSphere and DataPower which may take 2 seconds or longer. Additionally, since the new applications may be built in cloud environments, the cost to build new applications may be lower versus building mainframe applications.

In various embodiments, the data stored in the various databases may comprise a collection of data including and/or originating from customer information, transaction information, account information, record of sales, account history, customer history, sensor data, machine log data, data storage system, public web data, and/or social media. Data may be collected from multiple sources and amalgamated into a big data structure such as a file, for example. In that regard, the data may be used as an input to generate metadata describing the big data structure itself as well as the data stored in the structure.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The system or any components may integrate with system integration technology such as, for example, the ALEXA system developed by AMAZON. Alexa is a cloud-based voice service that can help you with tasks, entertainment, general information and more. All Amazon Alexa devices, such as the Amazon Echo, Amazon Dot, Amazon Tap and Amazon Fire TV, have access to the Alexa Voice Service. The system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The system may allow the user to access information about eligible accounts linked to an online account across all Alexa-enabled devices.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, the server may include application servers (e.g. WEB SPHERE, WEB LOGIC, JBOSS, EDB® Postgres Plus Advanced Server® (PPAS),etc.). In various embodiments, the server may include web servers (e.g. APACHE, IIS, GWS, SUN JAVA® SYSTEM WEB SERVER, JAVA Virtual Machine running on LINUX or WINDOWS).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MAC-BOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as microapplications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), MongoDB®, Redis®, Apache Cassandra®, HBase by APACHE®, MapR-DB, or any other suitable database product. Moreover, the databases may be organized in any suitable manner, for example, as data tables or lookup tables. Each record may be a single file, a series of files, a linked series of data fields or any other data structure.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   receiving, by a computer-based system, a structured query language (SQL) call from a cloud-based application;
   generating, by the computer-based system, a virtual server instance to handle the SQL call;
   identifying, by a gateway executed in the computer-based system and based at least in part on the SQL call, an information management system (IMS) database;
   establishing, by the gateway, a routing path to the virtual server instance;
   translating, by the gateway, the SQL call to a (DL/I) call;
   transmitting, by the gateway, the DL/I call to the IMS database;
   receiving, by the gateway, a response from the IMS database; and
   transmitting, by the gateway, the response to the virtual server instance using the routing path.

2. The method of claim 1, wherein the virtual server instance transmits the response to the cloud-based application.

3. The method of claim 1, wherein the gateway comprises IMS Connect.

4. The method of claim 3, wherein the IMS Connect is exposed to the cloud-based application as an API as a service.

5. The method of claim 1, further comprising referring, by the gateway, to a mapping table to identify the IMS database.

6. The method of claim 1, wherein the SQL call is received in a data request comprising at least one of: a get request, a put request, a post request, or a delete request.

7. The method of claim 1, wherein the virtual server instance is running on a cloud network.

8. A system comprising:
   a processor; and
   a tangible, non-transitory memory configured to communicate with the processor, the tangible, non-transitory memory having instructions stored thereon that, in response to execution by the processor, cause the processor to perform operations comprising:
   receiving, by the processor, a structured query language (SQL) call from a cloud-based application;
   generating, by the processor, a virtual server instance to handle the SQL call;
   identifying, by a gateway executed on the processor and based at least in part on the SQL call, an information management system (IMS) database;
   establishing, by the gateway, a routing path to the virtual server instance;
   translating, by the gateway, the SQL call to a (DL/I) call;
   transmitting, by the gateway, the DL/I call to the IMS database;
   receiving, by the gateway, a response from the IMS database; and
   transmitting, by the gateway, the response to the virtual server instance using the routing path.

9. The system of claim 8, wherein the virtual server instance transmits the response to the cloud-based application.

10. The system of claim 8, wherein the gateway comprises IMS Connect.

11. The system of claim 10, wherein the IMS Connect is exposed to the cloud-based application as an API as a service.

12. The system of claim 8, the operations further comprising referring, by the gateway, to a mapping table to identify the IMS database.

13. The system of claim 8, wherein the SQL call is received in a data request comprising at least one of: a get request, a put request, a post request, or a delete request.

14. The system of claim 8, wherein the virtual server instance is running on a cloud network.

15. An article of manufacture including a non-transitory, tangible computer readable storage medium having instructions stored thereon that, in response to execution by a computer-based system, cause the computer-based system to perform operations comprising:
  receiving, by the computer-based system, a structured query language (SQL) call from a cloud-based application;
  generating, by the computer-based system, a virtual server instance to handle the SQL call;
  identifying, by a gateway executed in the computer-based system and based at least in part on the SQL call, an information management system (IMS) database;
  establishing, by the gateway, a routing path to the virtual server instance;
  translating, by the gateway, the SQL call to a (DL/I) call;
  transmitting, by the gateway, the DL/I call to the IMS database;
  receiving, by the gateway, a response from the IMS database; and
  transmitting, by the gateway, the response to the virtual server instance using the routing path.

16. The article of claim 15, wherein the virtual server instance transmits the response to the cloud-based application.

17. The article of claim 15, wherein the gateway comprises IMS Connect.

18. The article of claim 17, wherein the IMS Connect is exposed to the cloud-based application as an API as a service.

19. The article of claim 15, further comprising referring, by the gateway, to a mapping table to identify the IMS database.

20. The article of claim 15, wherein the SQL call is received in a data request comprising at least one of: a get request, a put request, a post request, or a delete request.

* * * * *